United States Patent
Colby

(10) Patent No.: US 9,688,253 B1
(45) Date of Patent: Jun. 27, 2017

(54) CHOCK DEPLOYMENT APPARATUS

(71) Applicant: Bradley W. Colby, Mooringsport, LA (US)

(72) Inventor: Bradley W. Colby, Mooringsport, LA (US)

(*) Notice: Subject to any disclaimer, the term of this patent is extended or adjusted under 35 U.S.C. 154(b) by 0 days.

(21) Appl. No.: 14/956,481

(22) Filed: Dec. 2, 2015

(51) Int. Cl.
*B60T 3/00* (2006.01)

(52) U.S. Cl.
CPC ...................... *B60T 3/00* (2013.01)

(58) Field of Classification Search
CPC ................ B60T 1/14; B60T 3/00; B60T 7/12
USPC ....................... 188/4 R, 32; 410/30
See application file for complete search history.

(56) References Cited

U.S. PATENT DOCUMENTS

| | | | |
|---|---|---|---|
| 1,401,350 A * | 12/1921 | Monahan | B60T 1/14 188/4 R |
| 1,653,420 A * | 12/1927 | Van Koolbergen | B60T 1/14 188/4 R |
| 2,036,910 A | 4/1936 | Balensiefer | |
| 2,182,044 A * | 12/1939 | Ackerman | B60T 3/00 188/3 R |
| 2,386,595 A | 10/1945 | Connell et al. | |
| 2,718,283 A | 9/1955 | Ropp | |
| 2,960,191 A | 11/1960 | Roberts | |
| 3,086,619 A | 4/1963 | Grotz | |
| 3,303,907 A | 2/1967 | Burtnett | |
| 3,517,776 A | 6/1970 | Corti et al. | |
| 4,354,580 A | 10/1982 | Delasantos et al. | |
| 4,487,396 A * | 12/1984 | Hoffman | B60P 3/12 188/4 R |
| 4,580,662 A * | 4/1986 | Kershaw | B60T 7/12 188/4 R |
| 4,949,817 A | 8/1990 | Knies | |
| 5,901,816 A * | 5/1999 | Camilleri | B60T 3/00 188/32 |
| 6,378,956 B1 | 4/2002 | Van De Walker | |
| 6,957,722 B1 | 10/2005 | Baskerville, Sr. | |
| 6,978,865 B2 | 12/2005 | Fougere | |
| 8,006,811 B2 | 8/2011 | Andersen et al. | |
| 8,465,245 B2 * | 6/2013 | Manone | B65G 69/005 188/32 |
| 2012/0118680 A1 | 5/2012 | Giglio | |

* cited by examiner

*Primary Examiner* — Christopher Schwartz
(74) *Attorney, Agent, or Firm* — R. Keith Harrison

(57) ABSTRACT

A chock deployment apparatus includes a chock, a tether reel carried by the chock and a chock tether extendable from the tether reel. In typical application, the chock tether can be attached to the vehicle. The chock can be selectively wedged between a wheel of the vehicle and the surface to prevent the chocked wheel from inadvertently rolling on the surface. Alternatively, the chock can be stowed in a storage configuration when not in use.

18 Claims, 7 Drawing Sheets

CHOCK DEPLOYMENT APPARATUS

FIELD

Illustrative embodiments of the disclosure generally relate to chocks which prevent inadvertent movement of a vehicle along a surface. More particularly, illustrative embodiments of the disclosure relate to a chock deployment apparatus which can be secured to a vehicle and includes a tethered chock that can be selectively wedged between a wheel of the vehicle and the surface to prevent the chocked wheel from inadvertently rolling on the surface, or stowed in a storage configuration when not in use.

SUMMARY

Illustrative embodiments of the disclosure are generally directed to a chock deployment apparatus. An illustrative embodiment of the chock deployment apparatus includes a chock, a tether reel carried by the chock and a chock tether extendable from the tether reel. In typical application, the chock tether can be attached to the vehicle. The chock can be selectively wedged between a wheel of the vehicle and the surface to prevent the chocked wheel from inadvertently rolling on the surface. Alternatively, the chock can be stowed in a storage configuration when not in use.

BRIEF DESCRIPTION OF THE DRAWINGS

Illustrative embodiments of the disclosure will now be described, by way of example, with reference to the accompanying drawings, wherein.

DETAILED DESCRIPTION

The following detailed description is merely exemplary in nature and is not intended to limit the described embodiments or the application and uses of the described embodiments. As used herein, the word "typical", "exemplary" or "illustrative" means "serving as an example, instance, or illustration." Any implementation described herein as "typical", "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "foremost", "rear", "side", "above", "below", "top", "horizontal" and "vertical" as used herein are intended for descriptive purposes only and are not necessarily intended to be construed in a limiting sense. For purposes of description herein, such relative terms shall relate to the disclosed subject matter as oriented in FIGS. 6-8.

Figure 6:
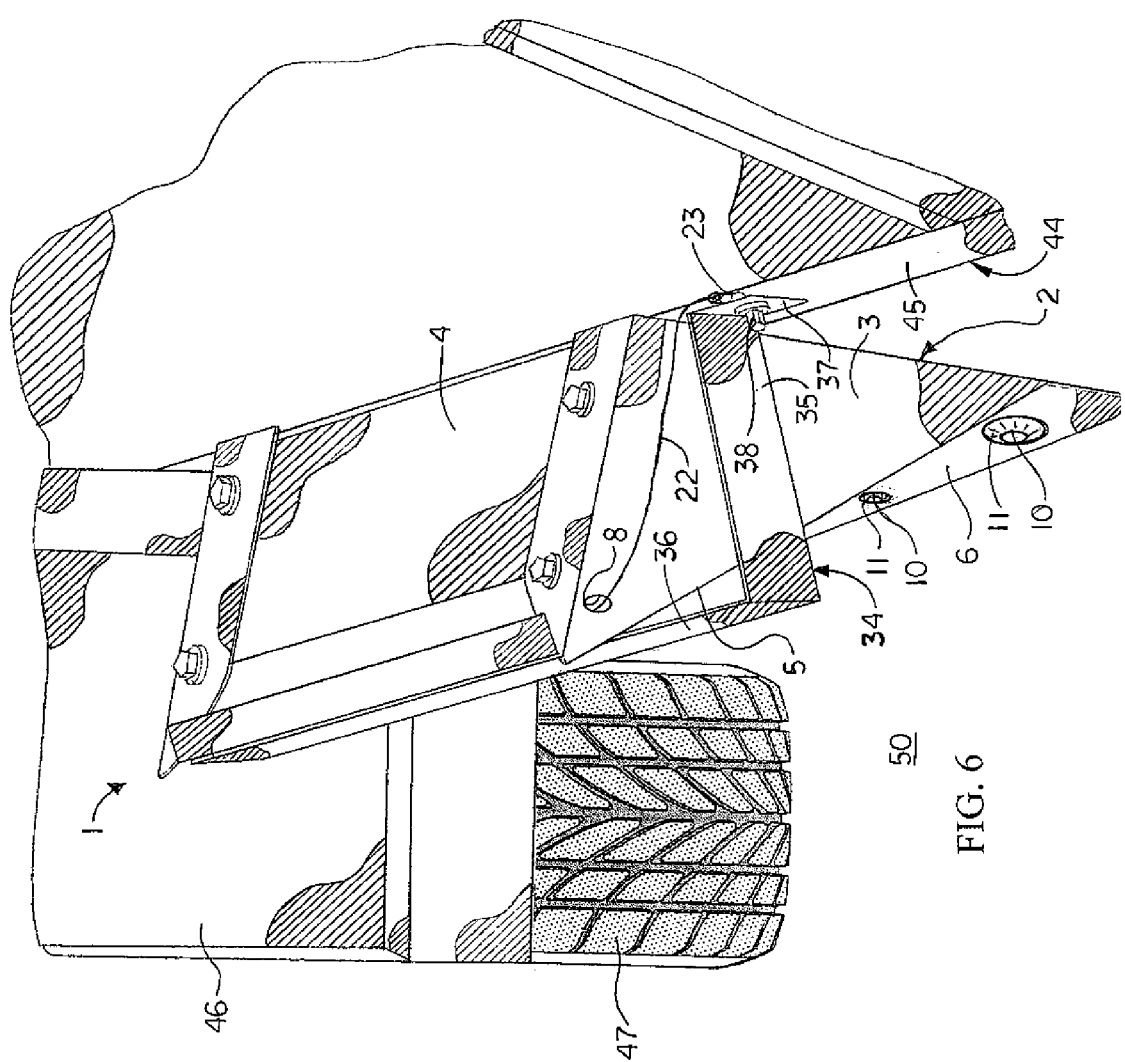
FIG. 6 is a perspective view of an illustrative embodiment of the chock deployment apparatus, with a chock mount bracket attached to a vehicle (partially in section) and the chock stowed in the chock mount bracket in a storage configuration of the chock deployment apparatus.
Figure 7:
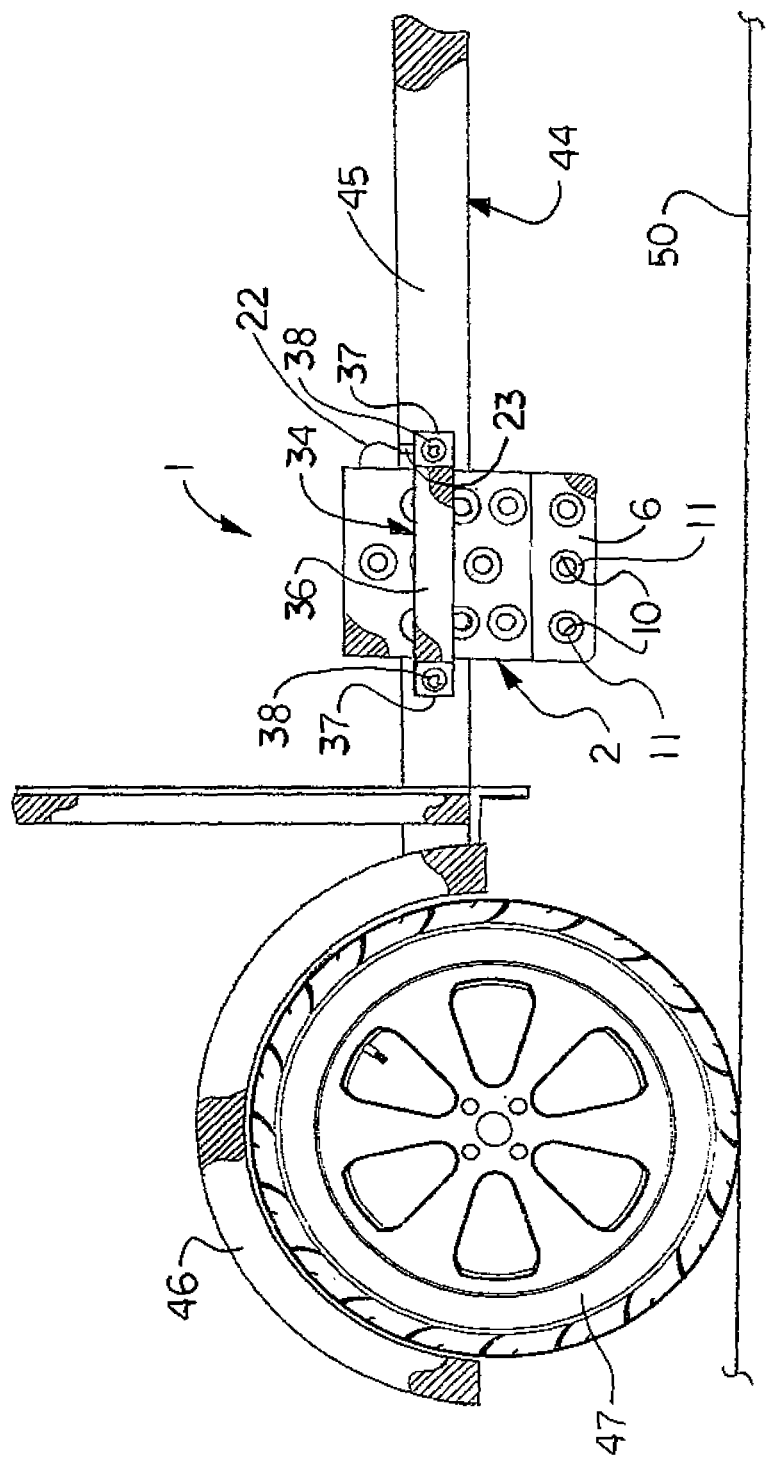
FIG. 7 is a side view of the vehicle, partially in section, with the chock stowed in the chock mount bracket on the vehicle in the storage configuration of the chock deployment apparatus.
Figure 8:
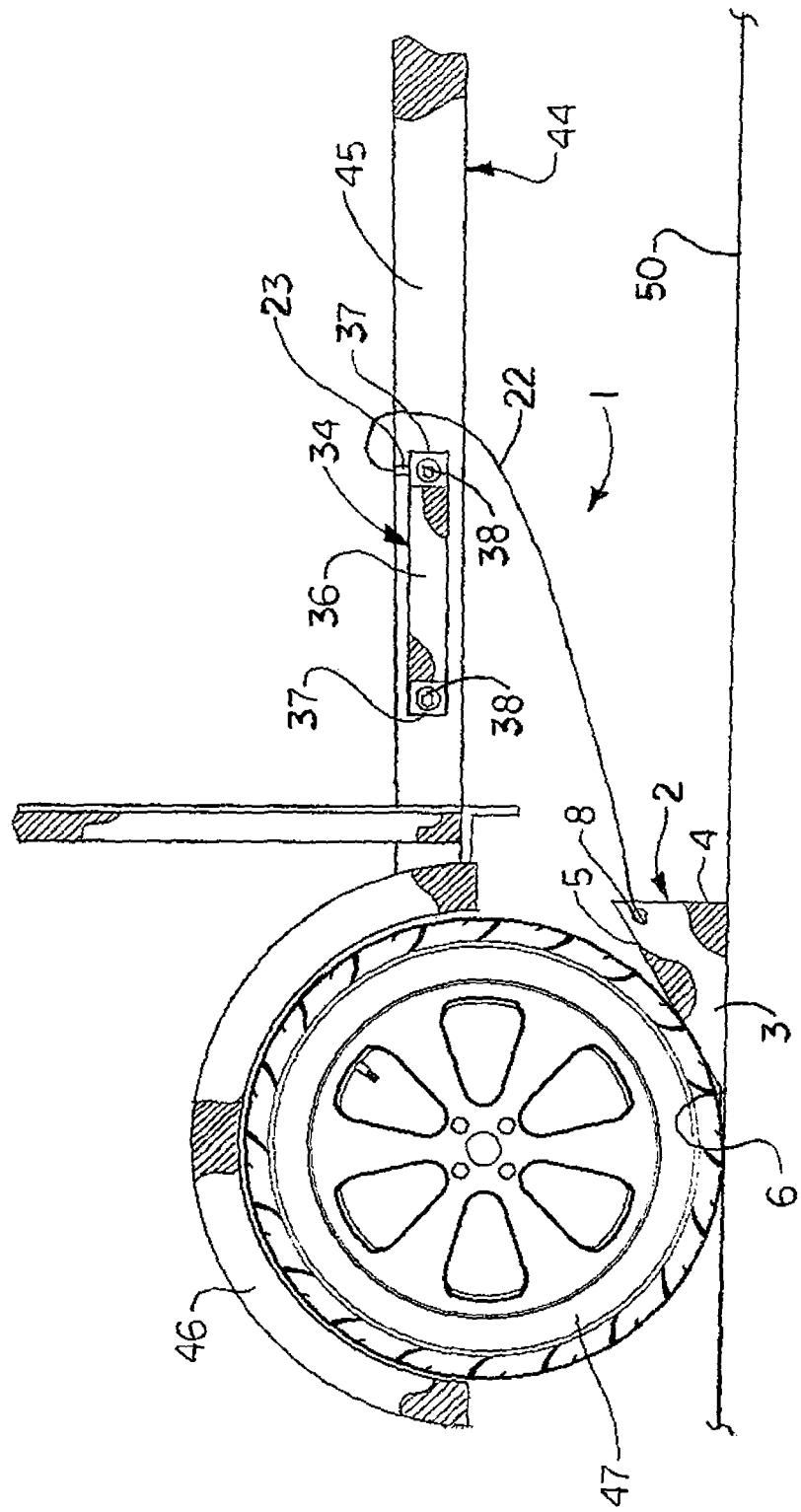
FIG. 8 is a side view of the vehicle, partially in section, with the chock removed from the chock mount bracket and wedged between a wheel of the vehicle and the surface to prevent inadvertent rolling of the wheel and movement of the vehicle on the surface in typical application of the chock deployment apparatus.

Referring initially to FIGS. 6-8 of the drawings, an illustrative embodiment of the chock deployment apparatus, hereinafter apparatus, is generally indicated by reference numeral 1. As will be hereinafter further described, the apparatus 1 may include a chock 2. As used herein, "chock" includes but is not limited to "a wedge or block placed against a wheel or rounded object to prevent it from moving". In typical application of the apparatus 1, which will be hereinafter described, the chock 2 can be wedged between a front or rear wheel 47 of a vehicle 44 and a surface 50 to prevent inadvertent rolling of the wheel 47 and movement of the vehicle 44 on the surface 50, particularly under circumstances in which the surface 50 is sloped or inclined. The apparatus 1 may include a chock mount bracket 34 which is mounted on the vehicle 44 typically using bracket mount bolts 38 and/or other suitable fastening techniques. As illustrated in FIGS. 6 and 7, when not in use, the chock 2 can be stowed in the chock mount bracket 34, which supports the chock 2 on the vehicle 44. As illustrated in FIG. 8, when use of the chock 2 is desired, the chock 2 can be removed from the chock mount bracket 34 and wedged between the surface 50 and the wheel 47 of the vehicle 44. Accordingly, the chock 2 prevents the wheel 47 from rolling on the surface 50 in the direction of the chock 2. A chock tether 22 may attach or tether the chock 2 to the chock mount bracket 34 and/or the vehicle 44 to prevent or minimize loss, misplacement or theft of the chock 2 and ensure that the chock 2 is available when needed. As used herein, "tether" includes but is not limited to "a cord, fixture or flexible attachment that anchors something movable to a reference point which may be fixed or moving". The chock tether 22 may be a cable, cord, rope, string or other flexible connector. The chock 2 and the chock mount bracket 34 may be fabricated of aluminum, steel, composite materials, plastics such as polypropylene or high-density polyethylene, and/or other materials which are consistent with the functional requirements of the apparatus 1. The chock 2 and the chock mount bracket 34 can be fabricated using casting, molding, machining and/or other fabrication techniques known by those skilled in the art.

Figure 1:
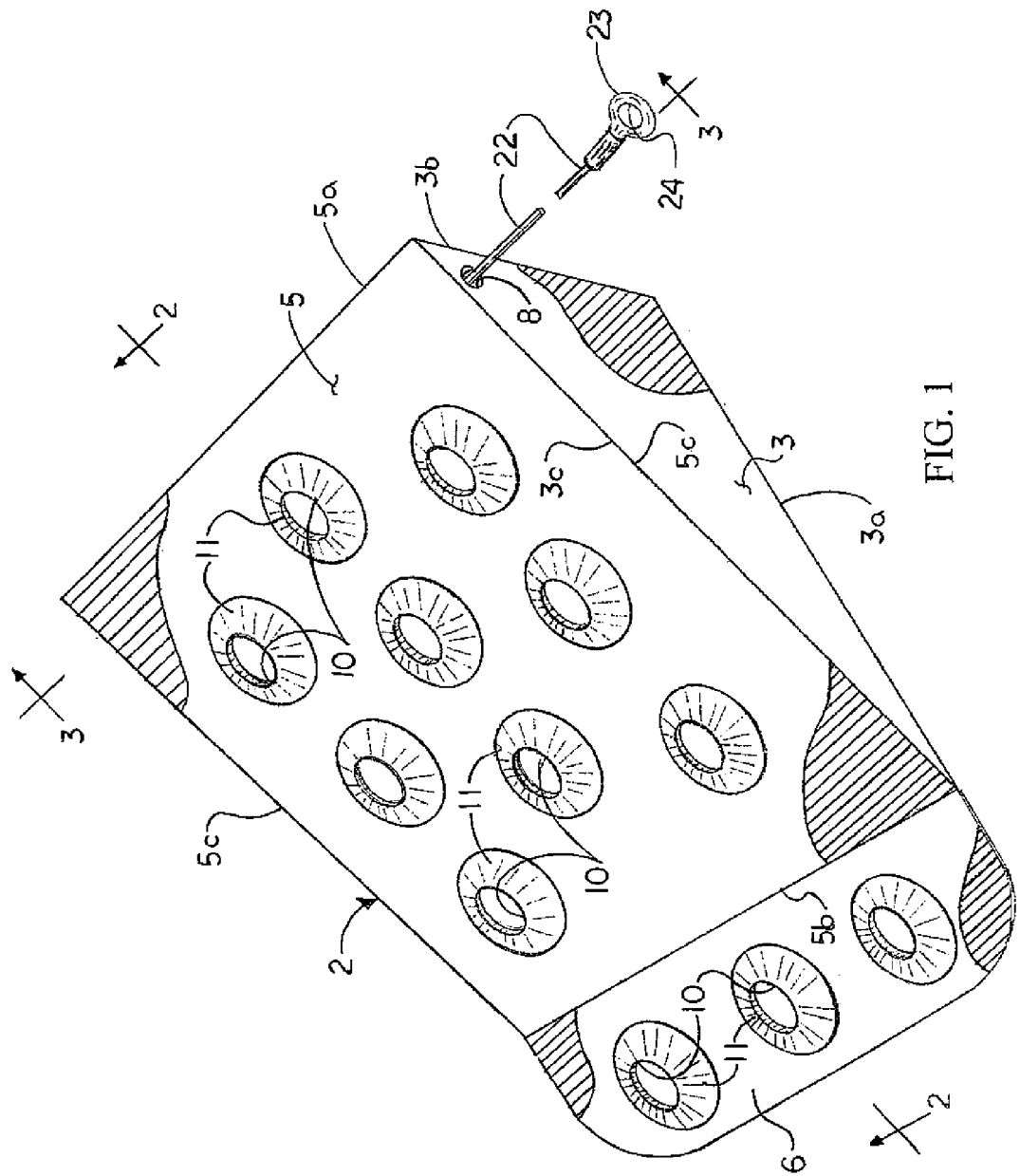
FIG. 1 is a front perspective view of a typical chock according to an illustrative embodiment of the chock deployment apparatus.

Referring next to FIGS. 1-5 of the drawings, in some embodiments, the chock 2 of the apparatus 1 may include a pair of spaced-apart, parallel chock side panels 3. As illustrated in FIG. 1, each chock side panel 3 may be generally triangular in shape with a lower side panel edge 3a, a rear side panel edge 3b and an angled front side panel edge 3c.

A chock rear panel 4 (FIGS. 2 and 3) may extend between the rear side panel edges 3b of the respective chock side panels 3. A sloped chock front panel 5 may extend between the front side panel edges 3c of the chock side panels 3. The chock front panel 5 may be generally rectangular in shape with a rear front panel edge 5a which joins the chock rear panel 4, a foremost front panel edge 5b which is parallel and opposite to the rear front panel edge 5a and a pair of spaced-apart, parallel side front panel edges 5c which extend between the rear front panel edge 5a and the foremost front panel edge 5b and join the front side panel edges 3c of the respective chock side panels 3. In some embodiments, a chock flange 6 may protrude forwardly from the foremost front panel edge 5b of the chock front panel 5. As illustrated in FIGS. 1 and 3, an outside tether opening 8 may extend through one of the chock side panels 3 for purposes which will be hereinafter described. In some alternative embodiments, the chock 2 may have any of a variety of other shapes and designs which are consistent with the functional requirements of the chock deployment apparatus 1.

Figure 2:
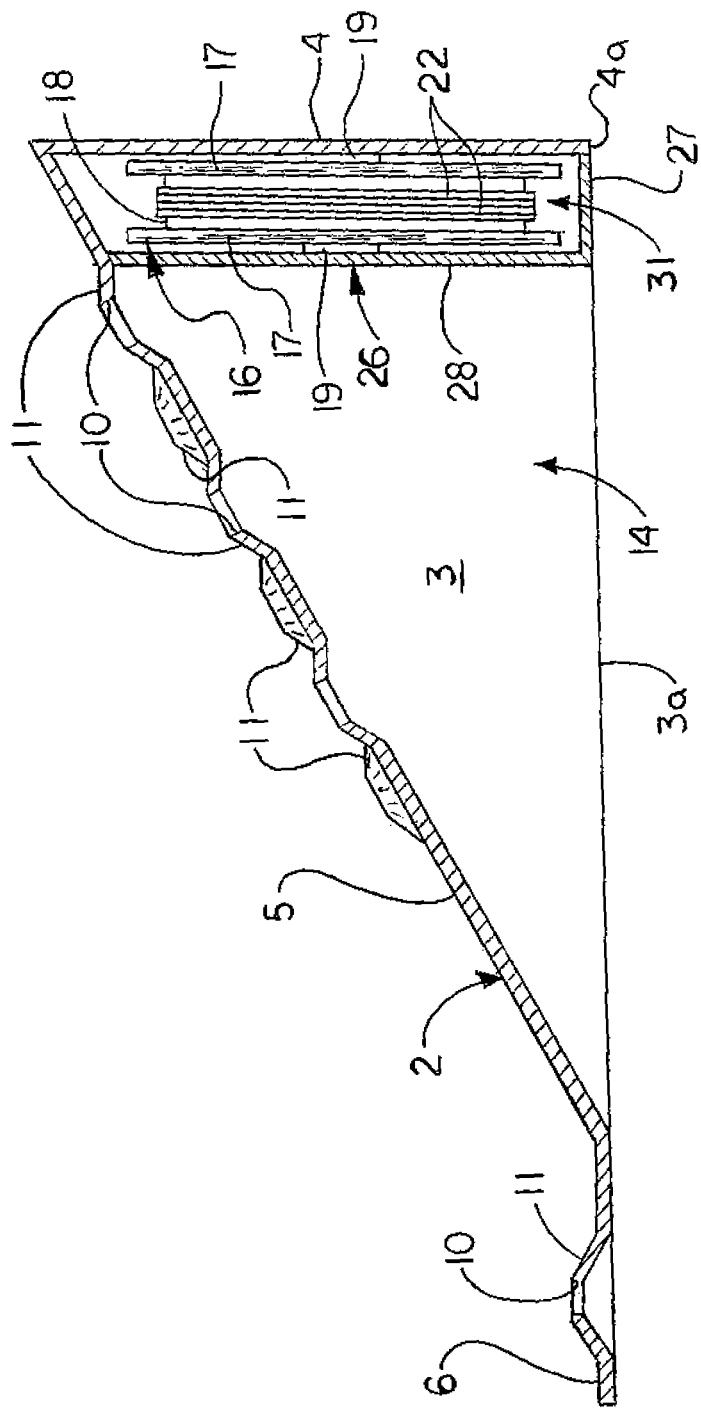
FIG. 2 is a longitudinal sectional view of the chock, taken along section lines 2-2 in FIG. 1.
Figure 3:
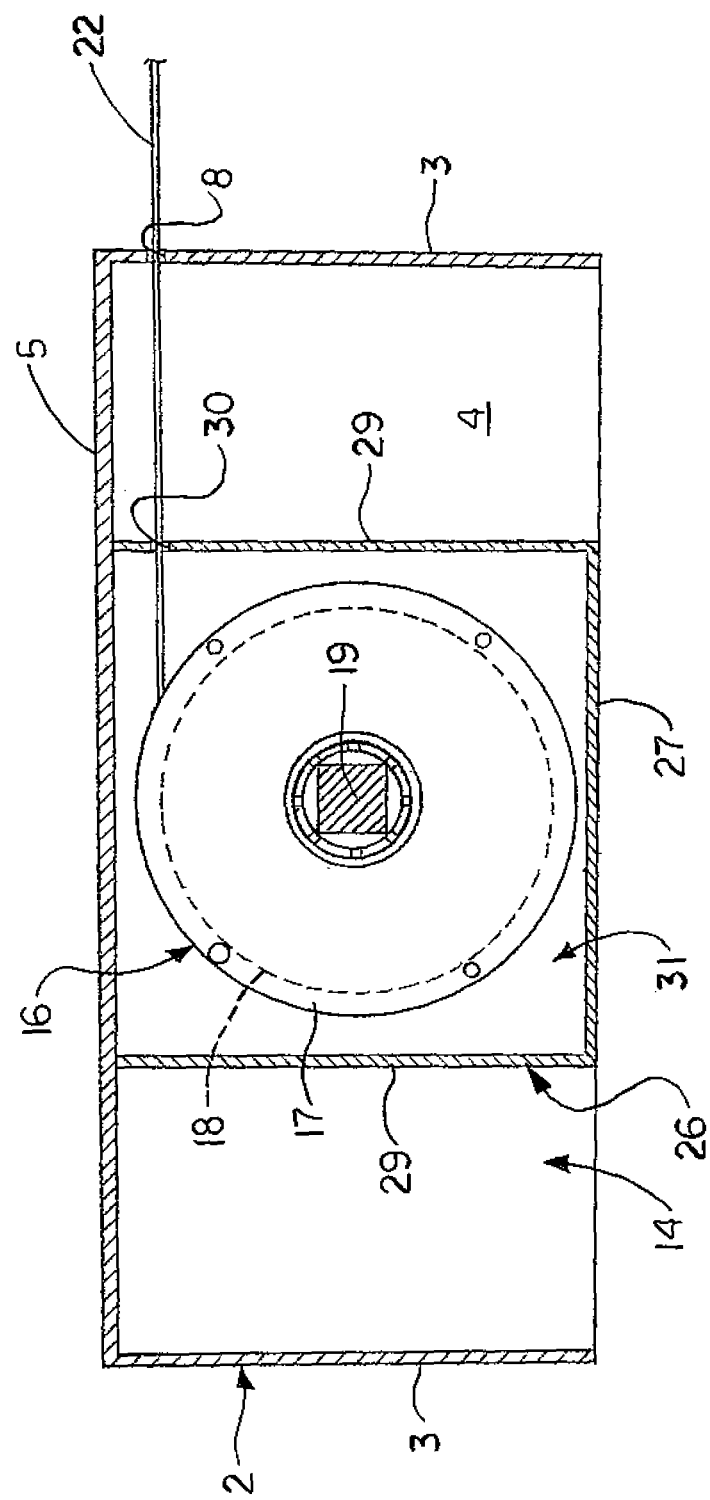
FIG. 3 is a transverse sectional view of the chock, taken along section lines 3-3 in FIG. 1.

As illustrated in FIGS. 1 and 2, in some embodiments, multiple chock openings 10 may extend through the chock front panel 5 of the chock 2 in a selective number and pattern. In some embodiments, each chock opening 10 may extend through a raised chock opening rim 11 which protrudes from the surface of the chock front panel 5. In some embodiments, at least one chock opening 10 and raised chock opening rim 11 may extend from the chock flange 6. The chock openings 10 and chock opening rims 11 may impart friction between the wheel 47 (FIG. 8) of the vehicle 44 and the chock front panel 5 of the chock 2 when the chock 2 is wedged between the vehicle wheel 47 and the surface 50, as illustrated in FIG. 8.

As illustrated in FIGS. 2 and 3, the chock 2 may have a chock interior 14. A tether reel 16 may be mounted for rotation inside the chock interior 14 according to the knowledge of those skilled in the art. As illustrated in FIGS. 2 and 3, in some embodiments, the tether reel 16 may be mounted for rotation within a plane which is parallel or adjacent to the plane of the chock rear panel 4 of the chock 2. In some embodiments, the tether reel 16 may be mounted for rotation on the chock rear panel 4 according to the knowledge of those skilled in the art. In other embodiments, the tether reel 16 may be mounted in alternative orientations or positions in the chock interior 14.

Figure 5:
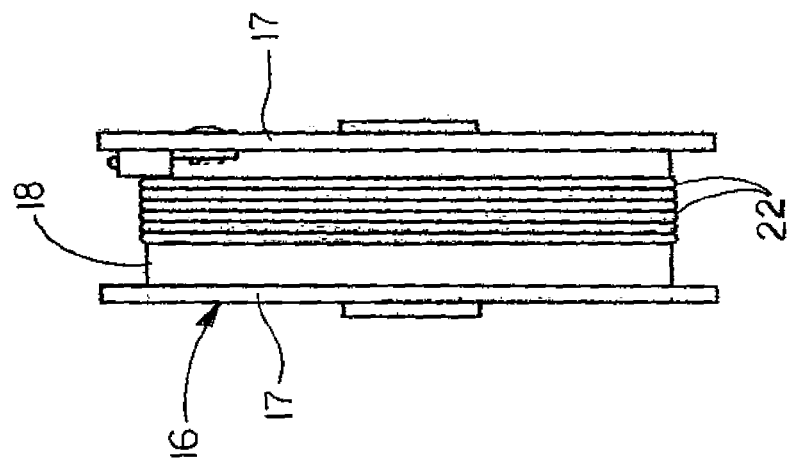
FIG. 5 is a front view of the tether reel illustrated in FIG. 4.
Figure 4:
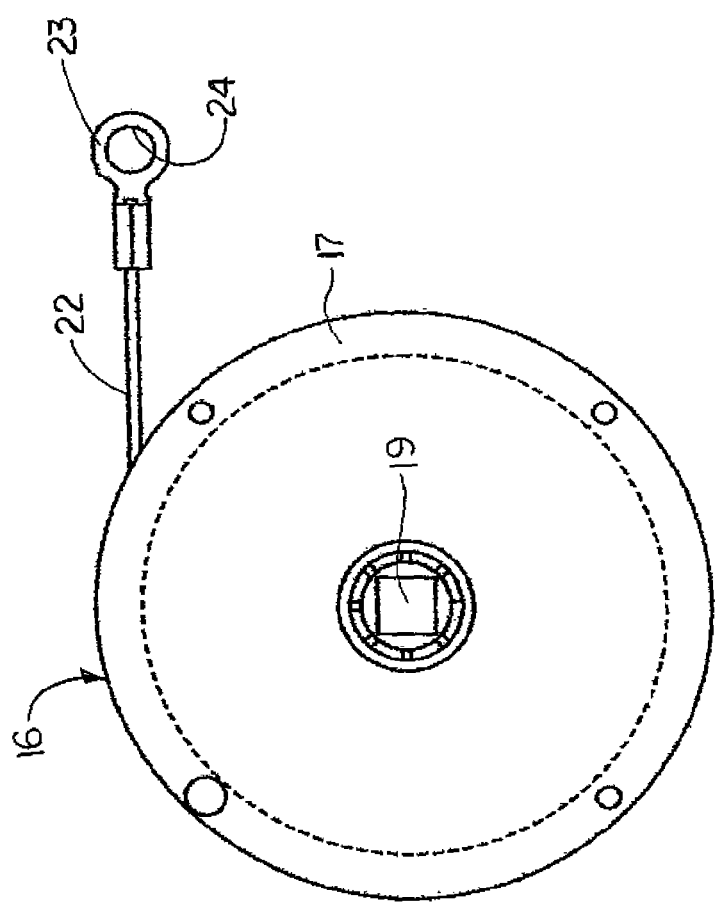
FIG. 4 is a side view of an illustrative tether reel which is suitable for implementation of an illustrative embodiment of the chock deployment apparatus.

As illustrated in FIGS. 4 and 5, in some embodiments, the tether reel 16 may have a conventional design with a pair of spaced-apart, parallel tether reel flanges 17. A cylindrical tether reel spool 18 may extend between the tether reel flanges 17. The chock tether 22 may be wound on the tether reel spool 18 between the tether reel flanges 17 of the tether reel 16. A tether reel axle 19 (FIG. 4) may mount the tether reel 16 for rotation within the chock interior 14 of the chock 2 according to the knowledge of those skilled in the art. As illustrated in FIG. 3, the chock tether 22 may extend from the tether reel 16 at least through the outside tether opening 8 in the chock side panel 3 of the chock 2. As illustrated in FIG. 1, a tether eyelet 23, having an eyelet opening 24, may terminate the unwound, extending or distal end of the chock tether 22 outside the chock interior 14 for purposes which will be hereinafter described. In some embodiments, the tether reel 16 may be spring-loaded according to the knowledge of those skilled in the art. As illustrated in FIGS. 3 and 4, a tether reel spring 20 may engage the tether reel 16. Accordingly, the tether reel 16 may normally tend to wind the chock tether 22 on the tether reel spool 18 of the tether reel 16. A non-limiting example of a tether reel 16 which is suitable for the apparatus 1 can be obtained from John Evans' Sons of Lansdale, Pa.

As further illustrated in FIGS. 2 and 3, in some embodiments, a reel box 26 having a box interior 31 may be provided in the chock interior 14 of the chock 2. The tether reel 16 may be mounted for rotation in the box interior 31 of the reel box 26 according to the knowledge of those skilled in the art. As illustrated in FIG. 2, the reel box 26 may include, for example and without limitation, a bottom box panel 27 which extends forwardly from a lower edge 4a of the chock rear panel 4 into the chock interior 14 and a front box panel 28 which extends between the bottom box panel 27 and the sloped chock front panel 5 of the chock 2. As further illustrated in FIG. 2, in some embodiments, the tether reel axle 19 may rotatably mount the tether reel 16 between the front box panel 28 of the reel box 26 and the chock rear panel 4 of the chock 2. As illustrated in FIG. 3, the reel box 26 may further include a pair of spaced-apart side box panels 29 which extend between the bottom box panel 27 of the reel box 26 and the chock front panel 5 of the chock 2. As further illustrated in FIG. 3, an inside tether opening 30 may extend through one of the side box panels 29 of the reel box 26. The inside tether opening 30 may be disposed in substantial alignment or registration with the outside tether opening 8 provided in the chock side panel 3 of the chock 2. Accordingly, the chock tether 22 may extend from the tether reel 16 through the inside tether opening 30 in the side box panel 29 of the reel box 26 and through the registering outside tether opening 8 in the chock side panel 3 of the chock 2, with the tether eyelet 23 (FIG. 1) terminating the chock tether 22 outside the chock interior 14. In alternative embodiments, the reel box 26 may be omitted or may have any of a variety of other shapes, designs and/or positions within the chock interior 14 which are consistent with the functional requirements of the chock deployment apparatus 1. The reel box 26 may be fabricated of aluminum, steel, composite materials, plastics such as polypropylene or high-density polyethylene, and/or other materials which are consistent with the functional requirements of the apparatus 1.

Referring again to FIGS. 6-8 of the drawings, in typical application of the chock deployment apparatus 1, the chock mount bracket 34 is attached to the vehicle 44. In some applications, the vehicle 44 may include a flatbed trailer having a vehicle frame 45 and vehicle wheels 47 (one of which is illustrated), each of which may be covered with a wheel well 46. In other applications, the vehicle 44 may include a flatbed truck or other type of vehicle or movable. The chock mount bracket 34 may include a pair of parallel, spaced-apart bracket arms 35. A spanning bracket segment 36 may extend between the bracket arms 35. A pair of bracket mount flanges 37 may terminate the respective bracket arms 35. The bracket mount flanges 37 may be attached to the vehicle frame 45 of the vehicle 44 via a pair of bracket mount bolts 38, for example and without limitation.

In some applications, the tether eyelet 23 which terminates the chock tether 22 may be secured between one of the bracket mount flanges 37 of the chock mount bracket 34 and the vehicle frame 45 of the vehicle 44. Thus, the bracket mount bolt 38 may be extended through a bolt opening (not illustrated) in the bracket mount flange 37 and then through the registering eyelet opening 24 (FIG. 1) of the tether eyelet 23, and then extended or threaded into a corresponding registering bolt opening (not illustrated) in the vehicle frame 45, and may be secured with a nut (not illustrated).

As illustrated in FIGS. 6 and 7, when not in use, the chock 2 may be deployed in a storage configuration in which it is stowed in the chock mount bracket 34. Accordingly, the chock 2 may initially be oriented in an inverted position above the chock mount bracket 34 with the chock flange 6 extending downwardly toward the surface 50 (FIGS. 6-8). The chock 2 may then be lowered through and nested in the chock mount bracket 34 with the chock rear panel 4 of the chock 2 facing upwardly. Thus, the chock front panel 5 may engage the upper edge of the spanning bracket segment 36 of the chock mount bracket 34 such that the chock 2 is cradled in the chock mount bracket 34, as illustrated in FIGS. 6 and 7.

When use of the chock 2 is desired to prevent the wheels 47 of the vehicle 44 from inadvertently rolling and the vehicle 44 from moving on the surface 50, such as when the vehicle 44 is parked, the chock 2 may be lifted from the chock mount bracket 34, pulled away from the chock mount bracket 34 and placed or wedged between the vehicle wheel 47 and the surface 50, as illustrated in FIG. 8. The chock 2 is typically placed on the side which is down slope from the vehicle wheel 47. As the chock 2 is lifted from the chock mount bracket 34 and pulled away from the vehicle 44 toward the vehicle wheel 47, the chock tether 22 may unwind from the tether reel 16 as the tether reel 16 typically rotates in the reel box 26 inside the chock interior 14 of the chock 2 and the chock tether 22 extends out from the chock 2 through the inside tether opening 30 (FIG. 3) in the side box panel 29 of the reel box 26 and the aligned outside tether opening 8 in the chock side panel 3 of the chock 2. The chock 2 may be oriented such that the chock side panels 3 and the chock rear panel 4 rest on the surface 50 and the vehicle wheel 47 of the vehicle 44 engages the chock front panel 5. Thus, the chock 2 remains wedged in place between the vehicle wheel 47 and the surface 50 to prevent inadvertent movement of the vehicle 44 on the surface 50. In some applications, the chock opening rims 11 which protrude from the chock front panel 5 of the chock 2 may impart friction against the vehicle wheel 47 to prevent the vehicle wheel 47 from slipping against the chock 2. The chock 2 may remain tethered or attached to the vehicle 44 through the chock tether 22, which may prevent or minimize the likelihood of loss, misplacement or theft of the chock 2.

When transport of the vehicle 44 is subsequently desired, the chock 2 is removed from between the vehicle wheel 47 and the surface 50 and stowed back in the chock mount bracket 34, as illustrated in FIGS. 6 and 7. As it is lifted from the surface 50 into proximity to the chock mount bracket 34, the chock tether 22 may be wound on the tether reel 16 as it is retracted through the outside tether opening 8 and the inside tether opening 30. Therefore, the chock 2 remains tethered to the vehicle 44 through the chock tether 22 and ensures that the chock 2 is available when needed.

While illustrative embodiments of the disclosure have been described above, it will be recognized and understood that various modifications can be made and the appended claims are intended to cover all such modifications which may fall within the spirit and scope of the disclosure.

What is claimed is:

1. A chock deployment apparatus for a vehicle, comprising:
   a chock including a pair of spaced-apart, parallel chock side panels, a chock rear panel extending between the chock side panels, a sloped chock front panel extending between the chock side panels and a chock interior formed by and between the chock side panels, the chock rear panel and the chock front panel, and wherein the tether reel is disposed in the chock interior;
   a tether reel carried by the chock; and
   a chock tether extendable from the tether reel.

2. The chock deployment apparatus of claim 1 further comprising a reel box in the chock interior, and wherein the tether reel is provided in the reel box.

3. The chock deployment apparatus of claim 1 further comprising a plurality of chock opening rims protruding from the chock front panel and a plurality of chock openings extending through the plurality of chock opening rims, respectively.

4. The chock deployment apparatus of claim 1 further comprising a chock flange protruding from the chock front panel opposite the chock rear panel.

5. The chock deployment apparatus of claim 1 further comprising a tether opening in one of the chock side panels, and wherein the chock tether extends through the tether opening.

6. The chock deployment apparatus of claim 1 wherein the tether reel is spring-loaded.

7. The chock deployment apparatus of claim 1 further comprising a tether eyelet terminating the chock tether.

8. A chock deployment apparatus for a vehicle, comprising:
   a chock including a pair of spaced-apart, parallel chock side panels, a chock rear panel extending between the chock side panels, a sloped chock front panel extending between the chock side panels and a chock interior formed by and between the chock side panels, the chock rear panel and the chock front panel, and wherein the tether reel is disposed in the chock interior;
   a tether reel carried by the chock;
   a chock tether extendable from the tether reel; and
   a chock bracket sized and configured to accommodate the chock in a stowed position of the chock.

9. The chock deployment apparatus of claim 8 further comprising a reel box in the chock interior, and wherein the tether reel is provided in the reel box.

10. The chock deployment apparatus of claim 8 further comprising a plurality of chock opening rims protruding from the chock front panel and a plurality of chock openings extending through the plurality of chock opening rims, respectively.

11. The chock deployment apparatus of claim 8 further comprising a chock flange protruding from the chock front panel opposite the chock rear panel.

12. The chock deployment apparatus of claim 8 further comprising a tether opening in one of the chock side panels, and wherein the chock tether extends through the tether opening.

13. The chock deployment apparatus of claim 8 wherein the tether reel is spring-loaded.

14. The chock deployment apparatus of claim 8 further comprising a tether eyelet terminating the chock tether.

15. A chock deployment apparatus for a vehicle, comprising:
   a chock including:
     a pair of spaced-apart, parallel chock side panels;
     a chock rear panel extending between the chock side panels;
     a sloped chock front panel extending between the chock side panels;
     a chock interior formed by and between the chock side panels, the chock rear panel and the chock front panel; and an outside tether opening in one of the chock side panels;
a reel box carried by the chock rear panel in the chock interior of the chock, the reel box having a box interior;
an inside tether opening in the reel box, the inside tether opening disposed in substantial alignment with the outside tether opening;
a tether reel in the box interior of the reel box;
a chock tether extending from the tether reel through the inside chock opening and the outside chock opening, the chock tether configured for attachment to the vehicle; and
a chock bracket configured for attachment to the vehicle, the chock bracket sized and configured to accommodate the chock in a stowed position of the chock.

16. The chock deployment apparatus of claim 15 further comprising a plurality of chock opening rims protruding from the chock front panel and a plurality of chock openings extending through the plurality of chock opening rims, respectively.

17. The chock deployment apparatus of claim 15 further comprising a chock flange protruding from the chock front panel opposite the chock rear panel.

18. The chock deployment apparatus of claim 15 wherein the tether reel is spring-loaded.

\* \* \* \* \*